United States Patent [19]

Eckberg

[11] Patent Number: 4,585,669

[45] Date of Patent: Apr. 29, 1986

[54] NOVEL DUAL CURE SILICONE COMPOSITIONS

[75] Inventor: Richard P. Eckberg, Saratoga Springs, N.Y.

[73] Assignee: General Electric Company, Waterford, N.Y.

[21] Appl. No.: 778,176

[22] Filed: Sep. 19, 1985

Related U.S. Application Data

[63] Continuation-in-part of Ser. No. 656,047, Sep. 28, 1984, abandoned.

[51] Int. Cl.$^4$ .............................................. B05D 3/06
[52] U.S. Cl. .................................. 427/54.1; 428/447; 428/452; 427/387; 528/15; 528/31; 528/32; 528/24
[58] Field of Search ....................... 528/31, 32, 15, 24; 427/387, 54.1; 428/387, 452

[56] References Cited

U.S. PATENT DOCUMENTS

| | | | |
|---|---|---|---|
| 3,726,710 | 4/1973 | Berger et al. | 204/159.13 |
| 3,865,588 | 2/1975 | Ohto et al. | 430/18 |
| 4,487,905 | 12/1984 | Mitchell | 528/31 |
| 4,487,906 | 12/1984 | Kniege et al. | 528/31 |
| 4,491,508 | 1/1985 | Olson et al. | 528/32 |
| 4,503,208 | 3/1985 | Lin et al. | 528/32 |

*Primary Examiner*—Melvyn I. Marquis
*Attorney, Agent, or Firm*—Gary L. Loser

[57] ABSTRACT

There is provided a method for making curable compositions containing silicon-bonded hydrogen atoms and silicon-bonded acrylate radicals, the improvement comprising adding at least one free radical type initiator and at least one precious metal or precious metal-containing hydrosilation catalyst so that crosslinking can be effected by two different mechanisms. Curable compositions and articles made therefrom are also provided.

49 Claims, No Drawings

NOVEL DUAL CURE SILICONE COMPOSITIONS

This application is a continuation-in-part of application Ser. No. 656,047, filed 9-28-84, now abandoned.

Reference is made to the copending patent application of Richard P. Eckberg, Ser. No. 656,106, filed on the same date as the present application and assigned to the same assignee as the present invention and now abandoned.

BACKGROUND OF THE INVENTION

The present invention generally relates to compositions which are curable by two different mechanisms. More particularly, the present invention relates to compositions which cure by both a free radical photoinitiated crosslinking reaction and a platinum catalyzed thermal hydrosilation reaction.

Silicone compositions have become widely accepted as protective coatings for electronic components mounted on circuit boards. The moisture resistance, thermal stability and resistivity of silicones make them ideal for this purpose. Previously developed silicone conformal coatings have been heat curable and furnished in organic solvents, however high energy costs as well as safety and environmental considerations have led to the development of such alternate technologies as ultraviolet radiation curable silicone coatings.

Both heat curable and UV-curable silicone conformal coatings have certain disadvantages. The use of heat curable conformal coatings risks damaging many fragile, heat sensitive electronic components. Consequently, thermal cure cycles can be extremely long, which in turn reduces production of coated circuit boards. On the other hand, while radiation curable silicone conformal coatings speed processing and avoid damaging the electronic components, in many instances a complete cure of the conformal coating is not effected due to what is called the "shadow effect". Briefly, the shadow effect is caused by components mounted on circuit boards which, because they project off the surface of the board, cast shadows and thereby prevent effective curing. While persons skilled in the art can overcome much of the shadow effect with mirrors, there can be crevices and the like where ultraviolet light simply cannot penetrate and thus where UV-curable compositions cannot be cured.

In view of the foregoing, the skilled artisan will appreciate that it is highly desirable to have available a composition which is both UV-curable and thermally curable (either at room temperature or at elevated temperatures) in order to overcome such shortcomings.

It is also desirable that such compositions can be utilized in other applications, for example, as silicone release coatings.

Platinum catalyzed addition curable silicone compositions are well known in the art. For example, Grenoble in U.S. Pat. No. 3,900,617 disclosed that flexible sheet material can be rendered non-adherent to surfaces which normally adhere thereto by coating the sheet material with a coating composition formed from (1) a vinyl chainstopped polysiloxane, (2) a hydrogen-containing polysiloxane and (3) a platinum catalyst effective to cause copolymerization of (1) and (2).

Other variations of such technology are disclosed in U.S. Pat. Nos. 4,256,870 and 4,340,647 to Eckberg, both of which are assigned to the same assignee as the present invention and are incorporated by reference into the instant disclosure.

Ohto et al., U.S. Pat. No. 3,865,588, discloses photopolymerizable compositions which contain at least one organopolysiloxane having an unsaturated radical of the formula

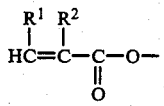

where $R^1$ is a hydrogen atom, a phenyl radical or a halogen substituted phenyl radical and $R^2$ is a hydrogen atom or a methyl radical. Exemplary of such radicals are the acryloxy radical, methacryloxy radical, cinnamoyloxy radical or a halogenated cinnamoyloxy radical.

In U.S. Pat. No. 3,726,710 to Berger et al. there is disclosed a composition comprising a vinyl group containing polyorganosiloxane having a sensitizer added thereto and which is curable by exposing it to high intensity ultraviolet rays.

Hatanaka et al., U.S. Pat. No. 4,451,634, discloses silicone elastomeric compositions suitable for ultraviolet ray curing comprising (A) 100 parts by weight of a polyorganosiloxane of the general formula $$(CH_3)_2R^1SiO\text{---}(R_2{}^2SiO)_{\overline{n}}SiR^1(CH_3)_2$$

wherein $R^1$ represents hydrogen or a monovalent radical selected from methyl, vinyl and hydroxy, $R^2$ represents hydrogen or a substituted or unsubstituted monovalent hydrocarbon radical, 0.02–49.95% based on the total number of $R^1$ and $R^2$ groups are vinyl radicals, 0.05–49.98% based on the total number of $R^1$ and $R^2$ groups are hydrogen, and n represents a number from 10 to 10,000; (B) 0.5 to 10 parts by weight of a polyorganosiloxane having the formula

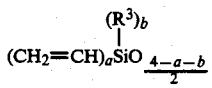

wherein $R^3$ is a substituted or unsubstituted monovalent hydrocarbon radical other than vinyl, a represents a number of $0.01 \leq a \leq 1$ on average, b represents a number of $0 \leq b \leq 3$ on average, and a+b is a number from 1 to 3; and (C) 0.1 to 10 parts by weight of a peroxy ester of the formula

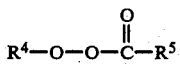

wherein $R^4$ is a substituted or unsubstituted monovalent aliphatic radical and $R^5$ is a substituted or unsubstituted monovalent aromatic radical.

Eckberg et al., U.S. patent application Ser. No. 527,299, filed Aug. 26, 1983, and assigned to the same assignee as the present invention, discloses an ultraviolet radiation curable composition comprising: (A) a diorganopolysilioxane comprising units of the formula RR'SiO, wherein R is hydrogen or a $C_{1-8}$ alkyl radical and R' is hydrogen, a $C_{1-8}$ alkyl radical or a monovalent mercaptoalkoxyalkyl-functional organic radical of 2 to 20 carbon atoms, (B) a polysiloxane consisting of from 0.5 to 100 mole percent of vinyl functional siloxane units of the formula $(CH_2=CH)R_n SiO_{(3-n)/2}$, where R is hydrogen or a $C_{1-8}$ alkyl radical and n has a value of 0 to 2, inclusive, and (C) a catalytic amount of photoinitiator.

Nowhere, however, to applicant's knowledge, is there disclosed or suggested a silicone composition which cures by both a free radical catalyzed UV-hydrosilation reaction and a platinum catalyzed hydrosilation reaction, and thereby avoids the shortcomings of those compositions which cure by only one of the recited mechanisms.

SUMMARY OF THE INVENTION

It is one object of the present invention to provide compositions which are curable by both a free radical photoinitiated crosslinking reaction and a precious metal catalyzed hydrosilation reaction.

It is another object of the present invention to provide articles such as circuit boards and the like having such compositions cured thereon.

Another object of the present invention is to provide methods for making the foregoing compositions and articles.

In accordance with a preferred embodiment of the present invention there is provided a curable composition comprising:

(A) a polysiloxane having the general formula:

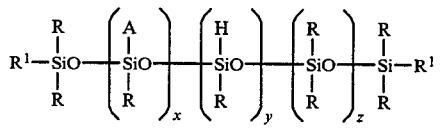
(I)

wherein each R is an independently selected substituted or unsubstituted monovalent hydrocarbon radical having from 1 to 20 carbon atoms; $R^1$ is hydrogen, a hydroxyl radical, or a substituted or unsubstituted, saturated or unsaturated hydrocarbon or hydrocarbonoxy radical having from 1 to 20 carbon atoms; A is an acrylate radical having the general formula:

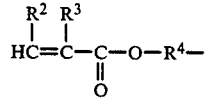
(II)

$R^2$ and $R^3$ are, independently, hydrogen or a substituted or unsubstituted hydrocarbon radical; $R^4$ is a divalent hydrocarbon radical having from 1 to 10 carbon atoms; x is a number such that there is from about 0.1 to about 50 mole percent acrylate-containing siloxy units; y is a number such that there is present from about 0 to about 50 mole percent hydrogen-containing siloxy units; and $x+y+z$ is a number such that the viscosity of said polysiloxane is from about 25 centipoise to about 2,500,000 centipoise at 25° C.;

(B) a free radical type photoinitiator;

(C) a precious metal or precious metal containing hydrosilation catalyst;

(D) when y equals zero, an organohydrogenpolysiloxane;

(E) optionally, an olefin-containing polysiloxane; and (F) optionally, a hydrosilation inhibitor.

Most preferably, the polysiloxane of Formula I includes up to about 20 mole percent alkenyl-containing siloxy units. This is due to the fact that a precious metal catalyzed SiH addition to an acrylate radical of Formula II is very slow in comparison with an SiH addition to an alkenyl radical such as, for example, vinyl or allyl. Accordingly, prompt thermal curing is insured by including alkenyl radicals in the system, either as part of the polysiloxane of Formula I or as separate component (E). The artisan can therefore appreciate that preferably the siloxane of Formula I has the general structure

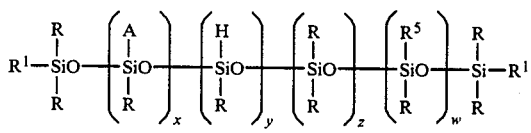

where R, $R^1$, A, x, y and z are as previously defined, $R^5$ is an olefinically unsaturated hydrocarbon radical, preferably vinyl, and w is a number such that there is present up to 20 mole percent alkenyl-containing siloxy units. Those of ordinary skill in the art will, of course, appreciate that there are many available variations in which to provide the silicon-bonded acrylate, hydrogen and alkenyl moieties.

DESCRIPTION OF THE INVENTION

In its broadest aspect, the present invention involves adding both a free radical type photoinitiator or photocatalyst and a precious metal or precious metal-containing hydrosilation catalyst to a curable composition having silicon-bonded hydrogen atoms and silicon-bonded acrylate radicals of the general formula:

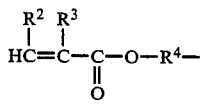

where $R^2$ and $R^3$ are, independently, hydrogen or a substituted or unsubstituted hydrocarbon radical, preferably methyl, and $R^4$ is a divalent hydrocarbon radical having from 1 to 10 carbon atoms. The silicon-bonded hydrogen atoms and the silicon-bonded acrylate radicals can be on the same or different polysiloxane chains. What is essential to the present invention is that, because of the presence of a photocatalyst, the silicon-bonded hydrogen atoms and silicon-bonded acrylate radicals will crosslink upon exposure to ultraviolet radiation, and that, because of the presence of a precious metal or precious metal-containing catalyst, the silicon-bonded hydrogen atoms and the silicon-bonded acrylate radicals or silicon-bonded alkenyl radicals will crosslink at room temperature or elevated temperatures.

In a preferred embodiment of the present invention there is provided a curable composition comprising:

(A) a polysiloxane having the general formula:

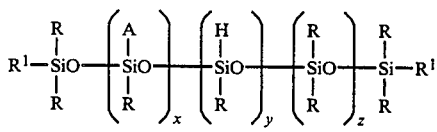

wherein each R is an independently selected substituted or unsubstituted monovalent hydrocarbon radical having from 1 to 20 carbon atoms; $R^1$ is hydrogen, a hydroxyl radical, or a substituted or unsubstituted hydrocarbon or hydrocarbonoxy radical having from 1 to 20 carbon atoms; A is an acrylate radical having the general formula:

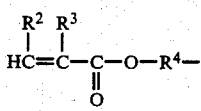

where $R^2$ and $R^3$ are, independently, hydrogen or a substituted or unsubstituted hydrocarbon radical; $R^4$ is a divalent hydrocarbon radical having from 1 to 10 carbon atoms; x is a number such that there is present from about 0.1 to about 50 mole percent acrylate-containing siloxy units; y is a number such that there is present from about 0 to about 50 mole percent hydrogen-containing siloxy units; and $x+y+z$ is a number such that the viscosity of said polysiloxane is from about 25 centipoise to about 2,500,000 centipoise at 25° C.;

(B) a free radical type photoinitiator;
(C) a precious metal or precious metal containing hydrosilation catalyst;
(D) optionally, an organohydrogenpolysiloxane;
(E) optionally, an olefin-containing polysiloxane; and
(F) optionally, a hydrosilation inhibitor.

In a more preferred embodiment the curable composition of the present invention includes up to about 20 mole percent alkenyl-containing siloxy units. Such alkenyl-containing siloxy units, which preferably are vinyl, are preferably included because a precious metal catalyzed SiH addition to an acrylate radical of Formula II is slow in comparison with an SiH addition to an alkenyl radical such as vinyl or allyl. Hence, the inclusion of alkenyl groups insures more rapid thermal curing of the composition. The artisan will therefore appreciate that preferably the siloxane of Formula I has the structure

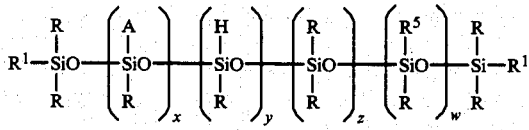

where R, $R^1$, A, x, y and z are as previously defined, $R^5$ is an olefinically unsaturated hydrocarbon radical, preferably vinyl, and w is a number such that there is present up to 20 mole percent alkenyl-containing siloxy units. Of course, it is still within the intended scope of the present invention to include such alkenyl radicals on a separate polysiloxane.

It should be noted that for purposes of the present invention the term "hydrogen-containing siloxy units" means that hydrogen is bonded directly to silicon.

Polysiloxane (A) of this invention is represented by the above Formula I, wherein the R groups can be any substituted or unsubstituted hydrocarbon radical having from 1 to 20 carbon atoms, for example, alkyl radicals such as methyl, ethyl, propyl, butyl, pentyl, hexyl, octyl and decyl; alkenyl radicals such as vinyl and allyl; cycloalkyl radicals such as cyclohexyl and cycloheptyl; aryl radicals such as phenyl; aralkyl radicals such as beta-phenylethyl; and any of such radicals wherein a part or all of the hydrogen atoms are replaced, for example, by halogen atoms such as fluorine, chlorine or bromine; cyanoethyl radicals or 3,3,3-trifluoropropyl radicals. From the viewpoint of availability and ease of synthesis, it is preferable that substantially all of the R radicals be either methyl or methyl and phenyl. In another preferred embodiment substantially all of the R radicals are selected from the group consisting of methyl, vinyl and phenyl radicals.

The $R^1$ radicals can be any of the foregoing R radicals and, in addition, can also be a hydrogen atom, hydroxyl radical or a hydrocarbonoxy radical having from 1 to 20 carbon atoms such as, for example, methoxy, ethoxy and propoxy.

The A moieties have the general formula:

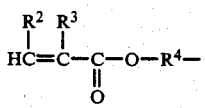

where $R^2$ and $R^3$ are selected, independently, from the group consisting of hydrogen and substituted or unsubstituted hydrocarbon radicals; $R^4$ is a divalent hydrocarbon radical having from 1 to 10 carbon atoms. Examples of organofunctional groups represented by A include acryloxy, methacryloxy, cinnamoyl, and crotonate and any other organic groups which crosslink in the presence of photo or thermal generated free radicals and which include the C=C structure. Preferably, $R^4$ is a divalent radical having from 2 to 5 carbon atoms and most preferably has 3 carbon atoms. Preferably $R^2$ and $R^3$ are, independently, hydrogen or a $C_{1-3}$ hydrocarbon radical.

It is not necessary that polysiloxane (A) contain silicon-bonded hydrogen atoms and silicon-bonded acrylate radicals in the same molecule. However, when y in Formula I is zero it is necessary to provide silicon-bonded hydrogen atoms in the form of a separate organohydrogenpolysiloxane as described more fully hereinbelow. The number of acrylate-containing siloxy units is generally from about 0.1 to about 50 mole percent based on the total number of siloxy units in polysiloxane (A). The number of hydrogen-containing siloxy units must be sufficient to react with substantially all of the acrylate-containing siloxy units and/or substantially all of the siloxane bonded alkenyl groups. Generally, there is from about 0.1 to 50 mole percent hydrogen-containing siloxy units based on the total number of siloxy units in polysiloxane (A). Those skilled in the art will be able to adjust the number of hydrogen-containing siloxy units and acrylate or alkenyl containing siloxy units to obtain a cured composition having predetermined properties.

The artisan will appreciate that the value for x can be zero in Formula I provided that in such case $R^1$ will be an acrylate radical of Formula II. It is also possible to employ a mixture of polymers, for example, polymers having hydrogen only on the polymer chain and acrylate radicals in the terminal positions. Similarly, it is possible to utilize a mixture wherein hydrogen is present only at the terminal positions and acrylate radicals only on the polymer chain. Other variations will be obvious to those of ordinary skill in the art.

As stated earlier, the value of y in Formula I can be zero provided that silicon-bonded hydrogen atoms are provided from another source. When $y=0$, a preferred composition has w greater than zero such that the polymer of Formula I includes acrylate and alkenyl functionality. However, it should be understood that in practicing the present invention it is merely necessary to provide silicon-bonded hydrogen atoms and silicon-bonded acrylate radicals in combination with a free radical type photoinitiator and a precious metal or precious metal-containing hydrosilation catalyst.

When the number of silicon-bonded hydrogen atoms or acrylate radicals is less than the above-said ranges, respectively, the adhering ability of the cured composition is reduced. When the number of these substituents is more than the above said ranges, respectively, thermal resistance is reduced or the curing rate is inadequate. When the number of silicon-bonded hydrogen atoms and silicon-bonded acrylate radicals is within the stated ranges, no foaming occurs upon exposure to ultraviolet radiation due to generation of hydrogen gas and the composition is sufficiently "set" after brief exposure to UV radiation to allow the coated article to be placed elsewhere for thermal curing. Thermal curing, for purposes of the instant application, includes subjecting the composition to elevated temperatures or merely allowing the precious metal catalyzed hydrosilation reaction to take place at room temperature.

The number of diorganosiloxy groups present in polysiloxane (A) is not critical and can be anywhere from zero to about 99.8 mole percent. Generally there should be sufficient diorganosiloxy units to provide polysiloxane (A) a viscosity of from about 25 centipoise to about 2,500,000 centipoise at 25° C. It is particularly preferred that some of the R groups of polysiloxane (A) be alkenyl radicals such as vinyl. It has been found that optimum results are obtained when the number of vinyl-containing siloxy units is from about 1 to about 10 mole percent based on the number of siloxy units in polysiloxane (A).

The artisan will appreciate that in addition to the difunctional units illustrated in Formula I, there may also be present trifunctional siloxy units of the formula R SiO$_{1.5}$, where R is as previously defined, and/or tetrafunctional siloxy units of the formula SiO$_2$. The number of such units employed, if any, will depend upon the particular application under consideration and can readily be determined by one of ordinary skill in the art without undue experimentation.

In a preferred embodiment of the present invention there is present from about 2 to about 20 mole percent acrylate-containing siloxy units, from about 2 to about 20 mole percent hydrogen-containing siloxy units, from about 2 to about 10 mole percent vinyl-containing siloxy units, and the viscosity of polysiloxane (A) is from about 100 centipoise to about 5000 centipoise at 25° C.

Free radical type photoinitiators or photocatalysts are well known in the art. Photoinitiator (B) of the present invention can be any known silicone compatible free radical type photoinitiator effective for promoting crosslinking between unsaturated silicon-bonded groups such as acrylate and vinyl and silicon-bonded hydrogen atoms.

Especially preferred photoinitiators for promoting crosslinking between unsaturated groups and SiH groups are disclosed by Eckberg et al., U.S. patent application Ser. No. 527,299, filed Aug. 26, 1983, and assigned to the same assignee as the present invention. This patent application is incorporated by reference into the present application for its teaching related to such photoinitiators. Briefly, Eckberg et al. disclose that combinations of certain perbenzoate esters having the general formula:

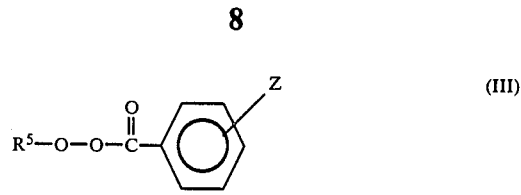

where $R^5$ is a monovalent alkyl or aryl group and Z is hydrogen, alkyl, halogen, nitro, amino, or amido and photosensitizers such as benzophenone photocatalyze the addition reaction of SiH groups and unsaturated groups bonded to siloxy units. The nature of the Z substituent will affect the stability of the peroxy bond; an electron-poor substituent stabilizing the peroxy bond and an electron-rich substituent making the peroxy bond more reactive. These perbenzoate esters may be synthesized in known ways, such as by reacting benzoyl halides with hydroperoxides (see, e.g. the descriptions in Blomquist and Berstein, J. Amer. Chem. Soc., 73, 5546 (1951)). Preferred perbenzoate esters include t-butylperbenzoate and its para-substituted derivatives, t-butylper-p-nitrobenzoate, t-butylper-p-methoxybenzoate, t-butylper-p-methylbenzoate and t-butylper-p-chlorobenzoate.

The amount of photoinitiator employed is not critical, so long as proper crosslinking is achieved. As with any catalyst, it is preferable to use the smallest effective amount possible. Generally, the amount of photoinitiator is at least 1 part by weight and, preferably, can be anywhere from about 1 to about 10 parts by weight based on 100 parts by weight of polysiloxane (A). More preferably, the photocatalyst level is from about 1 to about 5 parts by weight per 100 parts by weight polysiloxane (A).

Other photoinitiators, whose suitability for use in a particular situation can easily be ascertained by the artisan, are described in U.S. Pat. Nos. 3,759,807, 3,968,305, 3,966,573, 4,113,592, 4,131,529, 4,310,600, and 4,348,462. Diethoxyacetophenone is an example of a silicone soluble photoinitiator particularly useful in photocatalyzing crosslinking of acryloxy-containing silicones. All of these patents are incorporated by reference into the instant disclosure for their teachings related to photoinitiators.

Component (C) can be any precious metal or precious metal-containing catalyst effective for initiating a thermal hydrosilation cure reaction. Especially included are all of the well known platinum and rhodium catalysts which are effective for catalyzing the addition reaction between silicon-bonded hydrogen atoms and silicon-bonded olefinic groups. Examples of platinum or platinum-containing complexes, which are the most preferred of the precious metal catalysts, include platinum metal on charcoal, the platinum hydrocarbon complexes described in U.S. Pat. Nos. 3,159,601 and 3,159,662 to Ashby, the platinum alcoholate catalysts described in U.S. Pat. No. 3,220,970 to Lamoreaux, the platinum complexes described in U.S. Pat. No. 3,814,730 to Karstedt, and the platinum chloride-olefin complexes described in U.S. Pat. No. 3,516,946 to Modic. All of the aforesaid U.S. patents relating to platinum or platinum-containing catalysts are incorporated by reference into the instant disclosure.

The most preferred catalyst for facilitating the thermal hydrosilation reaction are the Ashby catalysts described in U.S. Pat. Nos. 3,159,601 and 3,159,662. Other platinum metal and platinum-containing catalysts which can be employed in the present invention are well known to those skilled in the art.

Hydrosilation catalysts other than those based on platinum may also be used to effect thermal curing. For example, complexes of the metals rhodium, ruthenium, palladium, osmium and irridium can be utilized. Of the non-platinum based catalysts, those based on rhodium are most preferred. The preparation and description of preferred rhodium catalysts are set forth in U.S. Pat. No. 4,347,346 to Eckberg, which is also incorporated herein by reference.

As with photoinitiator (B), the amount of precious metal or precious-metal containing catalyst (C) is not critical so long as proper crosslinking is achieved. Typically, the amount of precious metal or precious metal-containing catalyst is from about 10 to about 500 ppm as metal atoms based on polysiloxane (A) If the optional organohydrogenpolysiloxane (D) and vinyl containing polysiloxane (E) are included it may be desirable to utilize a greater amount of catalyst (C). Of course, the skilled artisan can determine the appropriate amount of catalysts (B) and (C) without undue experimentation. The artisan will also appreciate that it is within the scope of the present invention to employ mixtures of the various photocatalysts and precious metal or precious metal-containing catalysts.

Organohydrogensiloxane (D) can be either a fluid, resin or mixture thereof which those skilled in the art utilize as a crosslinking agent in addition curable silicone systems. Particularly useful organohydrogenpolysiloxanes for practicing the present invention are trimethyl chainstopped polymethylhydrogensiloxane fluids having from approximately 10% to 100% SiH groups, any remaining groups being dimethylsiloxy units, and having a viscosity in the range from about 10 to about 1000 centipoise at 25° C. However, any organohydrogenpolysiloxane having the general formula

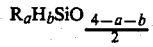 (IV)

is within the scope of the present invention. Such organohydrogenpolysiloxanes are well known in the art, for example, as described in U.S. Pat. Nos. 3,344,111 and 3,436,366, both of which are incorporated by reference into the present disclosure.

Among the radicals included within R of Formula III are alkyl such as methyl, ethyl and propyl; cycloalkyl such as cyclopentyl, cyclohexyl and cycloheptyl, aryl such as phenyl, naphthyl, tolyl and xylyl, aralkyl such as phenylethyl and phenylpropyl; and substituted radicals of any of the foregoing, for example, halogen substituted and cyanoalkyl substituted.

Other organohydrogenpolysiloxane fluids are well known in the art and are described in greater detail in U.S. Pat. No. 4,448,815 to Grenoble and Eckberg, which is also incorporated herein by reference.

It is possible to utilize an organohydrogenpolysiloxane resin in place of, or in addition to, the organohydrogenpolysiloxane fluid. Such organohydrogenpolysiloxane resins are also well known in the art, for example, as described in U.S. Pat. No. 4,041,010 to Jeram which is incorporated by reference into the instant disclosure. Briefly, organohydrogenpolysiloxane resins comprise either

units and $SiO_2$ units, where the ratio of R+H units to $SiO_2$ units ranges from 1.0 to 2.7 and where R is as previously defined, or

units, $R_2SiO$ units, and $SiO_2$ units, where the ratio of R+H units to $SiO_2$ units ranges from 1.2 to 2.0 and where R is as previously defined.

If an organohydrogenpolysiloxane is employed, it can be employed in any amount to obtain specific properties in the cured product. Generally, it should be utilized in a range of from about 1.0 parts by weight to about 10 parts by weight per 100 parts by weight of polysiloxane (A). In a preferred embodiment there is utilized a mixture of organohydrogenpolysiloxane fluid and organohydrogenpolysiloxane resin. While no particular ratio of fluid to resin is required, a ratio of from about 0.1 parts fluid per part resin on a weight basis to about 10 parts fluid per part resin on a weight basis has been found to provide compositions suitable for use as a coating composition.

Another optional component for practicing the instant invention is olefin-containing polydiorganosiloxane (E). As with organohydrogenpolysiloxane (D), olefin-containing polydiorganosiloxane (E) can be either a fluid or a resin and preferably is a mixture thereof. Most preferably component (E) is a vinyl-containing polydiorganosiloxane. A typical vinyl-containing polydiorganosiloxane fluid has the formula:

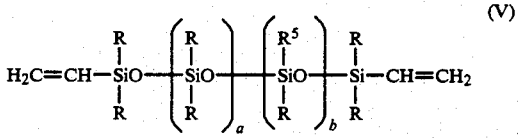 (V)

wherein R is as previously defined; $R^5$ is a radical having alkenyl unsaturation, preferably vinyl; and a and b are positive integers such that the vinyl chainstopped polysiloxane has up to about 20% by weight $R^5$ groups. The viscosity of such a polysiloxane ranges from about 50 to about 100,000 centipoise at 25° C. Such polysiloxane fluids are also described in U.S. Pat. No. 4,448,813 to Grenoble and Eckberg.

Vinyl-containing silicone resins are also known in the art, for example, as described in U.S. Pat. No. 4,041,010 to Jeram. Generally these resins are selected from the class consisting of resins having $ViR_2SiO_{0.5}$ units and $SiO_2$ units where the ratio of hydrocarbon substituents to Si varies from 0.8 to 2.7 and resins having $ViR_2SiO_{0.5}$ units, $R_2SiO$ units and $SiO_2$ units where the ratio of hydrocarbon substituents to Si varies from 0.8 to 2.4. For more specific details relating to such resins and their preparation the reader is referred to the cited Jeram U.S. Pat. No. 4,041,010.

If a vinyl-containing polysiloxane is employed in the present invention it can be utilized in any amount. As the artisan will appreciate, including precious metal or precious metal-containing catalyst (C) in the same package as polysiloxane (A) will result in product gelation or curing before it reaches the consumer provided polysiloxane (A) includes silicon-bonded hydrogen atoms. Accordingly, in a commercial environment, olefin-containing polysiloxane (E) serves primarily as a carrier of precious metal catalyst (C). Thus, in one embodiment of the present invention, the curable composition is provided in two or more packages; one package including therein the alkenyl-containing polysiloxane, precious metal catalyst and optional inhibitor, and the other package containing the remaining ingredients. Such two package systems are well known in the art. A particularly preferred multi-component packaging system can be adapted from the teachings of Grenoble and Eckberg in U.S. Pat. No. 4,448,815.

It is also contemplated that a hydrosilation inhibitor (F) can be included in the curable composition of the present invention in order to extend the work life of the composition. One example of a suitable inhibitor is disclosed in U.S. Pat. No. 4,256,870 wherein Eckberg teaches the use of organic esters of maleic acid to selectively retard the thermal addition cure reaction.

Eckberg discloses in U.S. Pat. No. 4,262,107 that other suitable inhibitor compounds are certain acetylenic compounds, olefinic carboxylic acid esters of aliphatic alcohols such as vinyl acetate, alkenyl isocyanurates and mixtures thereof.

In U.S. patent application Ser. No. 458,420, filed June 17, 1983, now U.S. Pat. No. 4,476,166 and assigned to the same assignee as the present invention, Eckberg discloses that a blend of a dicarboxylic acid ester having carbon to carbon unsaturation and an olefinic carboxylic acid ester of an aliphatic alcohol is particularly effective as an inhibitor. Each of the foregoing Eckberg patents are incorporated herein by reference.

In another aspect of the present invention there are provided methods for making the curable compositions of the present invention and methods for making articles having the compositions cured thereon.

The curable compositions are prepared merely by combining the various ingredients or by mixing the packages in which the various ingredients were provided. The articles of the present invention are prepared by applying such composition to a substrate such as a circuit board if it is to be used as a conformal coating, or to a flexible sheet material such as

® or paper if it is to be used as a release coating, thereafter exposing the coated substrate to ultraviolet radiation sufficient to set the composition, and finally allowing curing to be completed by exposing the article to either room temperature or elevated temperature. Of course, the higher the temperature, the more rapidly complete cure will take place.

In order that those skilled in the art might be better able to practice the present invention, the following examples are given by way of illustration and not by way of limitation. All parts are by weight unless otherwise indicated.

EXAMPLE 1

To a one liter flask there was added 155 grams dimethyldichlorosilane (1.2 moles) and 42 grams methylvinyldichlorosilane (0.3 mole). These monomers were then hydrolyzed with 24 grams water (1.33 moles) dispersed in 33 grams acetone over a 75 minute period at 18°–24° C. The reaction mixture was maintained at 20° C. for 40 minutes and at 40° C. for 40 minutes before being stripped under 33 mm vacuum at 105° C. for 15 minutes to provide 107 grams of a Cl-stopped linear copolymer. The linear chloro-stopped species was then treated with 114 grams methylmethacryloxypropyldichlorosilane (0.47 moles), 53 grams methyltrichlorosilane (0.36 moles), and 54 grams of a 700 centipoise silanol endstopped linear dimethylpolysiloxane fluid, and hydrolyzed with 130 grams water in a reaction medium of 1:1 toluene:acetone at 54°–68° C. This resulted in 264 grams of a clear 392 centipoise fluid designated polysiloxane ($A^1$). End group analysis revealed 2.0% hydroxyl functionality as OH. 150 grams of this fluid (approximately 0.18 moles OH) were then hydrolyzed with 38.3 grams trimethylchlorosilane (0.35 mole) in excess water at 60° C. Solvent and byproduct ($Me_3SiO_{0.5}$)$_2$ were removed in vacuo to furnish a final product designated polysiloxane ($A^2$) having a viscosity of about 175 centipoise at 25° C. and a hydroxyl content of about 0.12%.

The polysiloxanes (e.g. $A^1$ and $A^2$) were evaluated for UV cure performance. Comparative properties of interest are set forth in Table I.

TABLE I

| Composition | Visc., cps. | % OH | Maximum UV Cure line Speed* | Compatibility** with $MD_x^HM$ |
|---|---|---|---|---|
| $A^1$ | 392 | 2.0 | 1.5 m/s | Incompatible |
| $A^2$ | 175 | 0.12 | 1.0 m/s | Freely miscible in all proportions |

*2 mil coating on supercalendared kraft (SCK) stock, 400 watts per square inch UV power, nitrogen atmosphere, 4% diethoxyacetophenone (DEAP) photoinitiator. "Cure" is defined as smear-free coating.
**$MD_x^HM$ = methylhydrogenpolysiloxane having a viscosity of about 25 cps. at 25° C.; x~20.

Thermal cure studies were then conducted on the following blends:
  a. 100 parts polysiloxane ($A^2$) + 4 parts $MD_x^HM$ + 100 ppm Pt-containing catalyst as Pt.
  b. 90 parts polysiloxane ($A^2$) + 10 parts $MD_x^HM$ + 100 ppm Pt-containing catalyst at Pt.
  c. 90 parts polysiloxane ($A^2$) + 10 parts $MD_x^HM$ + 50 ppm Pt-containing catalyst at Pt.

The results of such thermal cure studies are set forth in Table II.

TABLE II

| Blend | Minimum 150° C. oven dwell to cure* | Bulk Gel time, 25° C. |
|---|---|---|
| a | 60 sec. | 3.5 hours |
| b | 15 sec. | 20 minutes |
| c | 15 sec. | 35 minutes |

*1 mil coatings on SCK stock. Cure defined as above.

Addition of 4% DEAP to blend (c) enabled UV cure comparable to polysiloxane ($A^2$) despite the presence of 10 percent methylhydrogenpolysiloxane crosslinking agent. Blend (c) was then applied in a layer 5 mil thick to a stainless steel Q panel and passed through a UV processor at 50 feet per minute under a nitrogen atmosphere and 400 watts per square inch lamp power. Areas kept in shadow were observed to cure to a non-tacky surface after being left undisturbed at 25° C. in the dark for 20 hours. Exposed areas were fully UV-cured immediately on exposure. This example illustrates the most preferred embodiment of the present invention.

The preferred packaging of such a dual cure composition would be to place in package A the UV curable polymer, photoinitiator and precious metal or precious metal-containing catalyst, and to place in package B the organohydrogenpolysiloxane crosslinking agent. A small amount of inhibitor such as butylallylmaleate or vinylacetate may also be included in package A.

EXAMPLE 2

In this example 25 grams of a 20 cps methylhydrogenpolysiloxane fluid, 30 grams sym-tetramethyltetravinylcyclotetrasiloxane and 445 grams octamethylcyclotetrasiloxane were equilibrated under nitrogen at 83° C. for 18.5 hours with 5 grams Filtrol 20 acid clay catalyst to furnish a 2000 centipoise fluid having the general formula

where D is a dimethylsiloxy unit, $D^H$ is a methylhydrogensiloxy unit and $D^{Vi}$ is a methylvinyl siloxy unit. 100 grams of a methacrylate functional silane having the formula

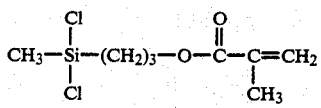

were added to the equilibrate as well as 0.05 gram di-t-butylhydroquinone. The mixture was agitated for one hour at 83° C. and then filtered to remove the heterogeneous equilibration catalyst. The fluid so obtained was a 70 centipoise fluid having 3.22 weight percent hydrolyzable chloride as chainstopper. 100 grams of such 70 cps. chloro-stopped fluid were then added to a 500 ml flask (0.0882 mole Cl) along with 50 grams toluene. The solution was agitated at 30° C. as 1.56 grams water (0.0867 mole) dissolved in 20 grams acetone were slowly added over a ten minute period. The temperature was maintained at 30°-35° C. for thirty minutes following the water addition. Twenty five grams water were then added to consume any remaining hydrolyzable chloride. The product mixture was transferred to a separatory funnel, the aqueous layer discarded, and the organic layer washed with 100 ml of 5% aqueous sodium bicarbonate. 85 grams of a 700 centipoise fluid designated polysiloxane ($A^3$) were obtained after 120° C., 15 mm vacuum stripping, and having the formula

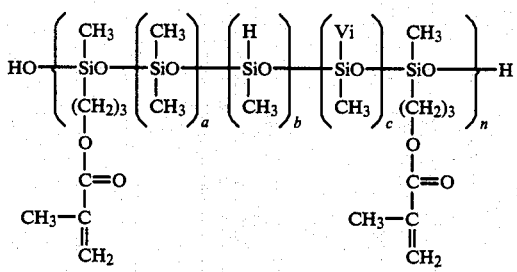

where the molecular weight is about 11,000, and where b is approximately equal to c which is approximately equal to ⅛ a.

Ultraviolet cure characteristics were determined by preparing a coating bath consisting of 10 parts polymer, 2.5 parts benzophenone and 4 parts diethoxyacetophenone. Cure studies were conducted under 400 watts per square inch focused total UV power in a PPG model 1202 QC Processor. The results are set forth in Table III.

TABLE III

| Substrate | Coating Thickness | Cure Atmosphere | Line Speed | Remarks |
|---|---|---|---|---|
| SCK | 1 mil | Air | 20 fpm | Cured to migration-free coating; smears with pressure. |
| SCK | Thin film | Air | 20 fpm | Cured to migration-free coating; smears with pressure. |
| SCK | 1 mil | $N_2$ | 100 fpm | Excellent cure to smear-free coating; good anchorage |
| SCK | 1 mil | $N_2$ | 200 fpm | Cured to migration-free coating; smears with pressure |
| PEK | 4 mil | $N_2$ | 100 fpm | Excellent cure to smear-free, glossy, tough coating, good anchorage. |

NOTES:
SCK = 40#/ream supercalendered kraft paper
PEK = polyethylenelaminated kraft paper
'Thin film' is ~1.5 grams/meter²

The observation that the cured coatings do not migrate to Scotch ®

610 cellophane tape suggested that the compositions of the present invention will function as release coatings. Accordingly, a coating bath was prepared as follows: 10 grams of the above-described polysiloxane ($A^3$), 0.25 grams benzophenone, and 0.4 grams diethoxyacetophenone dispersed in 50 grams acetone and 5 grams hexane. This mixture was coated onto SCK using a #8 wire-wound rod and then cured under exposure to 400 watts/inch² UV radiation at 100 feet per minute line speed under nitrogen. Seven miles of an aggressive SBR adhesive (Fasson SS-1) were coated and cured onto the silicone layer, then top-coated with another layer of SCK. Two inch wide tapes were prepared and the silicone layer delaminated from the adhesive layer at a 180° angle and 400 feet per minute pull speed. 70 to 80 grams force was required to separate the lamina which represents good release performance.

The thermal cure performance of polysiloxane ($A^3$) was then tested. Nine grams of polysiloxane ($A^3$) was combined with one gram of a 400 centipoise vinyl end-stopped dimethylpolysiloxane and 300 ppm of a platinum-containing hydrosilation catalyst (as platinum metal). The result was a clear fluid containing 30 ppm catalyst at Pt metal. Cure performance was assessed on SCK substrate at 150° C. The results are provided in Table IV.

TABLE IV

| Thickness | Oven Dwell Time | Remarks |
|---|---|---|
| 1 mil | 60" | cured to migration-free, smear-free coating. |
| 1 mil | 30" | cured, with slight migration, rub-off. |
| Thin film | 30" | cured to migration-free |

TABLE IV-continued

| Thickness | Oven Dwell Time | Remarks |
|---|---|---|
| (As defined above) | | release film. |

The foregoing illustrates that polysiloxane ($A^3$) can combine both UV curing and thermal curing so as to overcome the "shadow effect" suffered by prior art compositions which utilize only UV curing. This example also illustrates that the rate of UV curing release coatings can be increased since complete cure will be effected afterwards by thermal curing.

EXAMPLE 3

In this example 850 grams of dimethyldichlorosilane (6.6 moles), 92 grams methylhydrogendichlorosilane (0.8 moles), and 86 grams methylvinyldichlorosilane (0.6 mole) were treated with a dispersion of 130 grams water (7.22 moles) in 180 grams acetone by slow addition of the aqueous phase over a 150 minute period. The temperature was maintained at 16°–26° C. during the addition. The hydrilyzate was stripped to 100° C., 40 mm vacuum to furnish 504 grams of a 120 centipoise fluid having 6.04 weight percent $D^H$ units and 0.4 weight percent hydrolyzable chloride (as HCl). 200 grams of this chloride-stopped fluid was combined with 200 grams of methylmethacryloxypropyldichlorosilane and 200 grams of a 700 cps. silanol stopped dimethylpolysiloxane fluid in a blend of 400 ml acetone and 400 ml toluene. The mixture was then treated with 300 ml water by dropwise addition over a 75 minute period at 45°–60° C. Following hydrolysis, the product mixture was transferred to a separatory funnel, the aqueous layer discarded and the organic phase washed with 300 ml of a 5% $NaHCO_3$ solution. Stripping the organic phase of solvent and light ends at 100° C., 25 mm vacuum, afforded 454 grams of polysiloxane ($A^4$). To polysiloxane ($A^4$) there was added 9.1 grams benzophenone and 18.2 grams diethoxyacetophenone. The final product was a 160 centipoise fluid having 3.0 weight percent $D^H$ units. It is convenient to prepare the $Cl-D^H-D^{Vi}-D-Cl$ precursor fluid in situ, then carry out the cohydrolysis with the acrylic functional silane in the same pot. This eliminates the need to isolate the hydrolytically unstable chloride-stopped polydimethyl-methylhydrogen-methyl-vinylsiloxane intermediate.

In situ preparation of the chloride stopped precursor was employed to prepare polysiloxane ($A^5$) as follows: 136 grams dimethyldichlorosilane (1.054 moles), 35 grams methylhydrogendichlorosilane (0.304 mole) and 21 grams methylvinyldichlorosilane (0.149 mole) were hydrolyzed via a one hour addition of 23.3 grams water (1.29 moles) dispersed in 32.3 grams acetone at 18°–25° C. Stripping this material afforded 90 grams of a fluid containing 0.15% hydrolyzable chloride. This chloride-stopped polymer was then treated with 150 ml toluene and 150 ml acetone, 90 grams methylmethacryloxy-propyldichlorosilane, 45 grams of a silanol endstopped dimethylpolysiloxane having a viscosity of about 700 cps., and 45 grams, methyltrichlorosilane. The silane solution was then hydrolyzed with 125 ml water via addition over a period of 45 minutes at 45°–58° C. The resultant polysiloxane ($A^5$) had a viscosity of about 470 cps. and included 4.05% $D^H$ units (217 grams yield). To polysiloxane ($A^5$) there was added 4.9 grams benzophenone and 8.6 grams diethoxyacetophenone.

A third polymer, designated polysiloxane ($A^6$), was prepared as was polysiloxane ($A^6$) except that the reactants (85 grams $Cl-DD^HD^{Vi}-Cl$ fluid, 85 grams methylmethacrylicdichlorosilane, 64 grams 470 cps. silanol endstopped polydimethylsiloxane and 21 grams methyltrichlorosilane) were such so as to provide 209 grams of 130 cps. product having 5.8% $D^H$ units. To polysiloxane ($A^6$) there was added 2 weight percent benzophenone and 4 weight percent diethoxyacetophenone. All three of the compositions based on polysiloxane ($A^4$), ($A^5$) and ($A^6$) were complete one-part products for UV-cure applications. Qualitative UV cure performance was assessed as in Example 2. The results are set forth in Table V.

TABLE V

| Composition | Thickness | Atmosphere | Line Speed | Remarks |
|---|---|---|---|---|
| $A^4$ | 2 mil | $N_2$ | 100 fpm | Cured to smear-free glossy coating |
| " | " | " | 200 fpm | Undercured; smears badly |
| " | " | Air | 5 fpm | Cured to smear-free glossy coating. |
| $A^5$ | 2 mil | $N_2$ | 200 fpm | Cured to smear-free glossy, hard coating. |
| " | " | " | 300 fpm | Cured; slight smear |
| " | " | Air | 30 fpm | " |
| $A^6$ | 2 mil | $N_2$ | 100 fpm | Cured to smear-free glossy coating |
| " | " | " | 200 fpm | Slightly undercured -some smear. |
| " | " | Air | 10 fpm | Cured; slight smear |

Next a catalyst mixture was prepared as follows: 490 grams of a 400 cps blend of 95 parts dimethylvinyl-stopped dimethyl fluid and 5 parts soft (MW ~300,000) dimethylvinyl endstopped dimethyl silicone gum were combined with a platinum-containing catalyst sufficient to furnish 300 ppm Pt metal. To this mixture was added 11.8 grams (2 weight percent) benzophenone. This fluid proved to be compatible with methacrylated polysiloxanes ($A^4$), ($A^5$) and ($A^6$) to yield clear mixtures.

Thermal cure was ascertained by blending one part of the catalyst blend with 9 parts of each of polysiloxanes ($A^4$), ($A^5$) and ($A^6$). There was 30 ppm catalyst as Pt metal in each blend. A 2 ml thick coating of each experimental composition was applied on SCK substrate and placed in a forced air oven maintained at 150° C. The thermal cure results are set forth in Table VI.

TABLE VI

| Exp. # | Oven Dwell, sec. | Remarks |
|---|---|---|
| $A^4$ | 30 | Undercured; smears |
| " | 60 | Cured: sl smear |
| " | 90 | Complete cure; no smear |
| $A^5$ | 20 | Undercured; smears |
| " | 30 | Complete cure; no smear |
| $A^6$ | 20 | No cure observed |
| " | 30 | Undercured; smears |
| " | 40 | Complete cure; no smear |

A "shadow effect" experiment was then carried out using a 9:1 blend of polysiloxane ($A^5$) and the above-described catalyst mixture. Four ml thick coatings were applied to stainless steel panels, and a one inch L-shaped metal piece was then placed across the coated panel so as to effectively block ultraviolet radiation from reaching the composition across a one inch wide strip. The coatings were exposed to 400 watts focused UV radiation in a nitrogen atmosphere. Exposed areas cured to smear-free, glossy surfaces at 100 feet per minute line speed. Unexposed areas were wet after removal from the UV processor, but cured to tack-free surfaces after 16 hours at 25° C. in the dark.

EXAMPLE 4

These dual curable (meth)acrylated silicone polymers can be prepared in many ways besides the high-acid reverse hydrolyses illustrated in some of the previous examples. A dual-cure composition designated A$^7$ was synthesized in this fashion:

48 g of methylmethacryloxypropyldichlorosilane (0.2 moles)+7 g methylvinyldichlorosilane (0.05 moles)+208 g dimethyldichlorosilane (1.75 moles) were dispersed in 300 cc of toluene, then the silane solution slowly added to 1000 g of water over a 2.5 hour period at a temperature of 25°–40° C. The organic phase obtained from the low-acid hydrolysis was stripped to 150° C., 28 mm to yield 95 g of low molecular weight silanol-stopped polysiloxanes represented as HO{DD-$^{Vi}$D$^{MA}$}OH. Silanol content was about 5 weight percent as OH. This hydrolyzate was in turn dispersed in 300 g toluene, heated to reflux (113° C.), when 0.8 g stannous octoate was added. After 10 minutes at 113° C. about 0.6 ml H$_2$O had formed and was trapped out in a Claisen apparatus. The reaction mixture was cooled to 70° C., 20 g (0.17 mole) of dimethylvinylchlorosilane added followed by dropwise addition of 50 cc H$_2$O at 70° C. to convert silanol chainstopper to M$^{Vi}$ chainstopper. The product was worked up by washing with 5% NaHCO$_3$ solution (aqueous), isolated by a 90° C. strip at 15 mm vacuum. 98 g of M$^{Vi}${DD$^{Vi}$D$^{MA}$}M$^{Vi}$ were finally treated with 3.9 g diethoxyacetophenone photoinitiator and sufficient soluble platinum catalyst to furnish ~25 ppm Pt. The complete blended product was a clear 57 cps. fluid. (Persons skilled in the art will see that the viscosity of this product can be controlled by monitoring the amount of water condensed during the tin octoate-bodying step.)

2 mil coatings of the product A$^7$ cured to a smear-free, glossy surface on SCK substrate when exposed to 400 watts/square inch focused ultraviolet power at 100 ft/min. line speed in nitrogen. 100 parts of A$^7$ blended with 4 parts of 25 cps. trimethylsiloxy-stopped polymethylhydrogen fluid cured to a smear and migration-free coating when applied at 2 mil thickness on SCK paper upon 30 seconds dwell time at 150° C.; the UV-cure performance of the 100:4 blend proved indistinguishable from that of the unblended A$^7$ product. The blended mixture was a clear fluid which set up to a soft gel in 2 hours at 25° C.

The example A$^7$ demonstrated that this invention is not limited by its mode of processing, and that compositions of which these examples are representative fall within the scope of this application however they might be prepared.

I claim:

1. In a curable composition containing polymers having silicon-bonded hydrogen atoms and polymers having silicon-bonded acrylate radicals, the improvement comprising at least one part by weight per 100 parts by weight of said polymers having silicon-bonded hydrogen atoms and polymers having silicon-bonded acrylate radicals of at least one free radical photoinitiator and at least one precious metal-containing hydrosilation catalyst for effecting crosslinking of said silicon-bonded hydrogen atoms and said silicon-bonded acrylate radicals.

2. A curable composition comprising:

(A) a polysiloxane having the general formula:

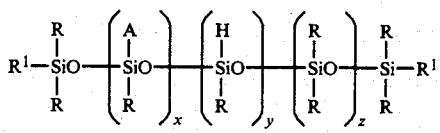

wherein each R is an independently selected substituted or unsubstituted monovalent hydrocarbon radical having from 1 to 20 carbon atoms; R$^1$ is hydrogen, a hydroxyl radical or a substituted or unsubstituted hydrocarbon or hydrocarbonoxy radical having from 1 to 20 carbon atoms; A is an acrylate radical having the general formula:

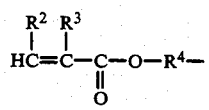

where R$^2$ and R$^3$ are, independently, hydrogen or a substituted or unsubstituted monovalent hydrocarbon radical; R$^4$ is a divalent hydrocarbon radical having from 1 to 10 carbon atoms; x is a number such that there is present from about 0.1 to about 50 mole percent acrylate-containing siloxy units; y is a number such that there is present from about 0 to 50 mole percent hydrogen-containing siloxy units with the proviso that if y is 0 there is present an organohydrogenpolysiloxane; and x+y+z is a number such that the viscosity of said polysiloxane is from about 25 centipoise to about 2,500,000 centipoise at 25° C.;

(B) at least one part by weight per 100 parts by weight of said polysiloxane of a free radical photoinitiator; and (C) a precious metal-containing hydrosilation catalyst.

3. The composition of claim 2 wherein y is zero, further comprising an organohydrogenpolysiloxane.

4. The composition of claim 2 wherein substantially all of the R radicals are selected from the group consisting of methyl, vinyl and phenyl radicals.

5. The composition of claim 2 wherein R$^2$ and R$^3$ are, independently, selected from the group consisting of hydrogen and C$_{1-3}$ monovalent hydrocarbon radicals and R$^4$ is a C$_{1-3}$ divalent hydrocarbon radical.

6. The composition of claim 2 wherein up to about 20 mole percent of the R radicals of the

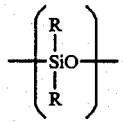

units are vinyl radicals.

7. The composition of claim 2 wherein x is a number such that there is present from about 2 to about 20 mole percent acrylate-containing siloxy units; y is number such that there is present from about 2 to about 20 mole percent hydrogen-containing siloxy units, and x+y+z is a number such that the viscosity of polysiloxane (A) is from about 200 centipoise to about 5000 centipoise at 25° C.

8. The composition of claim 1 or 2 wherein the free radical photoinitiator has the general formula:

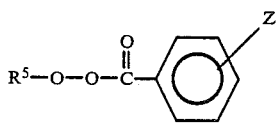

where $R^5$ is a monovalent alkyl or aryl group and Z is hydrogen, alkyl, halogen, nitro, amino or amido.

9. The composition of claim 8 wherein the free radical photoinitiator is selected from the group consisting of t-butylperbenzoate, t-butylper-p-nitrobenzoate, t-butylper-p-methoxybenzoate, t-butylper-p-methylbenzoate, and t-butylper-p-chlorobenzoate.

10. The composition of claim 9 wherein the free radical photoinitiator is t-butylperbenzoate.

11. The composition of claim 8 wherein the free radical photoinitiator further comprises a sensitizer which is an aromatic compound having at least one benzene ring which is alpha to a carbonyl group.

12. The composition of claim 11 wherein the sensitizer is benzophenone.

13. The composition of claim 1 or 2 wherein the precious metal-containing hydrosilation catalyst is selected from the group consisting of platinum metal, a platinum complexes, rhodium metal and rhodium complexes.

14. The composition of claim 1 or 2 wherein the free radical photoinitiator is present in an amount of from about 1 to about 10 parts by weight per 100 parts by weight polysiloxane (A) and the precious metal-containing catalyst is present in an amount of from about 10 ppm to about 500 ppm as precious metal based on polysiloxane (A).

15. The composition of claim 2 further comprising an organohydrogenpolysiloxane.

16. The composition of claim 2 further comprising a vinyl-containing polysiloxane.

17. The composition of claim 2 further comprising an organohydrogenpolysiloxane and a vinyl-containing polysiloxane.

18. The composition of claim 2 or 17 further comprising an inhibitor effective for preventing curing of said composition at temperatures below the heat cure temperature.

19. A curable composition comprising:
(A) a polysiloxane having the general formula:

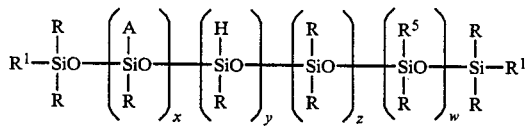

wherein substantially all of the R radicals are selected from the group consisting of methyl, vinyl and phenyl radicals; $R^1$ is selected from the group consisting of hydrogen atoms, hydroxyl radicals, methyl radicals and methoxy radicals; A is an acrylate radical having the general formula

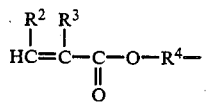

wherein $R^2$ and $R^3$ are, independently, selected from the group consisting of hydrogen and $C_{1-3}$ hydrocarbon radicals; $R^4$ is a $C_{1-3}$ divalent hydrocarbon radical; $R^5$ is an olefinically unsaturated hydrocarbon radical, w is a number such that there is present up to 20 mole percent of siloxy units having olefinically unsaturated hydrocarbon radicals, x is a number such that there is from about 2 to about 20 mole percent acrylate-containing siloxy units; y is a number such that there is from zero to about 20 mole percent hydrogen-containing siloxy units; and w+x+y+z is a number such that the viscosity of said polysiloxane varies from about 100 centipoise to about 5000 centipoise at 25° C.;

(B) from 1 to 10 parts by weight per 100 parts by weight polysiloxane (A) of a free radical photoinitiator selected from the group consisting of t-butylperbenzoate, t-butylper-p-nitrobenzoate, t-butylper-p-methoxybenzoate, t-butylper-p-methylbenzoate, t-butylper-p-chlorobenzoate, benzophenone, t-butylanthraquinone and diethoxyacetophenone;

(C) from 10 ppm to 500 ppm based on polysiloxane (A) of a platinum-containing hydrosilation catalyst, as platinum metal;

(D) optionally, an organohydrogenpolysiloxane;

(E) optionally, a vinyl-containing polydiorganosiloxane; and (F) an inhibitor effective for preventing curing of said composition at temperatures below the heat cure temperature.

20. In a method for making a curable composition containing polymers having silicon-bonded hydrogen atoms and polymers having silicon-bonded acrylate radicals, the improvement comprising adding at least one part by weight per 100 parts by weight of said polymers having silicon-bonded hydrogen atoms and polymers having silicon-bonded acrylate radicals of at least one free radical photoinitiator and at least one precious metal-containing hydrosilation catalyst for effecting crosslinking of said silicon-bonded hydrogen atoms and said silicon-bonded acrylate radicals.

21. A method for making a curable composition comprising mixing:
(A) a polysiloxane having the general formula:

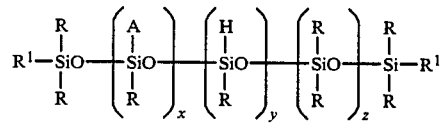

wherein each R is an independently selected substituted or unsubstituted monovalent hydrocarbon radical having from 1 to 20 carbon atoms; $R^1$ is hydrogen, a hydroxyl radical or a substituted or unsubstituted hydrocarbon or hydrocarbonoxy radical having from 1 to 20 carbon atoms; A is an acrylate radical having the general formula:

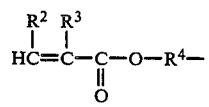

where $R^2$ and $R^3$ are, independently, hydrogen or a substituted or unsubstituted monovalent hydrocarbon radical; $R^4$ is a divalent hydrocarbon radical having from 1 to 10 carbon atoms; x is a number such that there is present from about 0.1 to about 50 mole percent acrylate-containing siloxy units; y is a number such that there is present from about 0 to 50 mole percent hydrogen-containing siloxy units with the proviso that if y is 0 there is present an organohydrogenpolysiloxane; and $x+y+z$ is a number such that the viscosity of said polysiloxane is from about 25 centipoise to about 2,500,000 centipoise at 25° C.;

(B) at least one part by weight per 100 parts by weight of said polysiloxane of a free radical photoinitiator; and (C) a precious metal-containing hydrosilation catalyst.

22. The method of claim 21 wherein y is zero, further comprising an organohydrogenpolysiloxane.

23. The method of claim 21 wherein substantially all of the R radicals are selected from the group consisting of methyl, vinyl and phenyl radicals.

24. The method of claim 21 wherein $R^2$ and $R^3$ are, independently, selected from the group consisting of hydrogen and $C_{1-3}$ monovalent hydrocarbon radicals and $R^4$ is a $C_{1-3}$ divalent hydrocarbon radical.

25. The method of claim 21 wherein up to about 20 mole percent of the R radicals of the

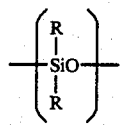

units are vinyl radicals.

26. The method of claim 21 wherein x is a number such that there is present from about 2 to about 20 mole percent acrylate-containing siloxy units; y is a number such that there is present from about 2 to about 20 mole percent hydrogen-containing siloxy units; and $x+y+z$ is a number such that the viscosity of polysiloxane (A) is from about 100 centipoise to about 5000 centipoise at 25° C.

27. The method of claim 20 or 21 wherein the free radical photoinitiator has the general formula:

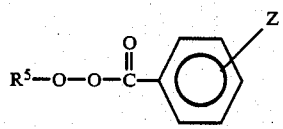

where $R^5$ is a monovalent alkyl or aryl group and Z is hydrogen, alkyl, halogen, nitro, amino or amido.

28. The method of claim 27 wherein the free radical photoinitiator is selected from the group consisting of t-butylperbenzoate, t-butylper-p-nitrobenzoate, t-butylper-p-methoxybenzoate, t-butylper-p-methylbenzoate, and t-butylper-p-chlorobenzoate.

29. The method of claim 28 wherein the free radical photoinitiator is t-butylperbenzoate.

30. The method of claim 27 wherein the free radical photoinitiator further comprises a sensitizer which is an aromatic compound having at least one benzene ring which is alpha to a carbonyl group.

31. The method of claim 30 wherein the sensitizer is benzophenone.

32. The method of claims 20 or 21 wherein the precious metal-containing hydrosilation catalyst is selected from the group consisting of platinum metal, platinum complexes, rhodium metal and rhodium complexes.

33. The methods of claims 20 or 21 wherein the free radical photoinitiator is present in an amount of from about 1 to about 10 parts by weight per 100 parts by weight polysiloxane (A) and the precious metal-containing catalyst is present in an amount of from about 10 ppm to about 500 ppm as precious metal based on polysiloxane (A).

34. The method of claim 21 further comprising mixing an organohydrogenpolysiloxane.

35. The method of claim 21 further comprising a vinyl-containing polysiloxane.

36. The method of claim 21 further comprising an organohydrogenpolysiloxane and a vinyl-containing polysiloxane.

37. The method of claim 21 or 36 further comprising an inhibitor effective for preventing curing of said composition at temperatures below the heat cure temperature.

38. A method for making a curable composition comprising mixing:

(A) a polysiloxane having the general formula:

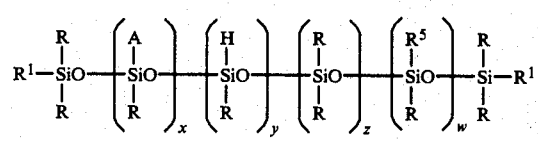

wherein substantially all of the R radicals are selected from the group consisting of methyl, vinyl and phenyl radicals;

$R^1$ is selected from the group consisting of hydrogen atoms, hydroxyl radicals, methyl radicals and methoxy radicals; A is an acrylate radical having the general formula

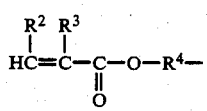

wherein $R^2$ and $R^3$ are, independently, selected from the group consisting of hydrogen and $C_{1-3}$ hydrocarbon radicals; $R^4$ is a $C_{1-3}$ divalent hydrocarbon radical; $R^5$ is an olefinically unsaturated hydrocarbon radical, w is a number such that there is present up to 20 mole percent of siloxy units having olefinically unsaturated hydrocarbon radicals, x is a number such that there is from about 2 to about 20 mole percent acrylate-containing siloxy units; y is a number such that there is from zero to about 20 mole percent hydrogen-containing siloxy units; and $w+x+y+z$ is a number such that the viscosity of said polysiloxane varies from about 100 centipoise to about 5000 centipoise at 25° C.;

(B) from 1 to 10 parts by weight per 100 parts by weight polysiloxane (A) of a free radical photoinitiator selected from the group consisting of t-butylperbenzoate, t-butylper-p-nitrobenzoate, t-butylper-p-methoxybenzoate, t-butylper-p-methylbenzoate, and t-butylper-p-chlorobenzoate, benzophenone, t-butylanthraquinone and diethoxyacetophenone;

(C) from 10 ppm to 500 ppm based on polysiloxane (A) of a platinum-containing hydrosilation catalyst, as platinum metal;

(D) optionally, an organohydrogenpolysiloxane;

(E) optionally, a vinyl-containing polydiorganosiloxane; and (F) an inhibitor effective for preventing curing of said composition at temperatures below the heat cure temperature.

39. An article of manufacture comprising:
(a) 100 parts by weight of component A and
(b) 1 to 100 parts by weight of component B, wherein component A comprises a mixture of (i) one or more polysiloxanes having silicon-bonded acrylate radicals; (ii) at least one part by weight per 100 parts by weight of polysiloxane of a free radical photoinitiator; (iii) a precious metal-containing hydrosilation catalyst; and component B comprises an organohydrogenpolysiloxane and wherein component A and component B are contained separate from one another.

40. An article of manufacture comprising:
(a) 100 parts by weight of component A and
(b) 1 to 100 parts by weight of component B, wherein component A comprises a mixture of (i) one or more polysiloxanes having silicon-bonded acrylate radicals and silicon-bonded hydrogen atoms and (ii) at least one part by weight per 100 parts by weight of polysiloxane of a free radical photoinitiator; and component B comprises a precious metal-containing hydrosilation catalyst dispersed in a vinyl-containing polysiloxane; and wherein component A and component B are contained separate from one another.

41. The article of claim 40 wherein component A is a mixture of a polysiloxane having silicon-bonded acrylate radicals, a polysiloxane having silicon-bonded hydrogen atoms, and a free radical type photoinitiator.

42. An article of manufacture prepared by the steps comprising:
I. mixing, so as to form a curable composition composition comprising:
(A) a polysiloxane having the general formula:

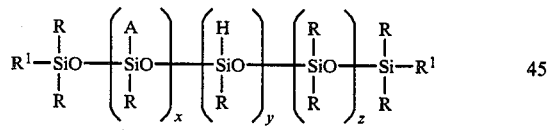

wherein each R is an independently selected substituted or unsubstituted monovalent hydrocarbon radical having from 1 to 20 carbon atoms; R¹ is hydrogen, a hydroxyl radical or a substituted or unsubstituted hydrocarbon or hydrocarbonoxy radical having from 1 to 20 carbon atoms; A is an acrylate radical having the general formula:

where R² and R³ are, independently, hydrogen or a substituted or unsubstituted monovalent hydrocarbon radical; R⁴ is a divalent hydrocarbon radical having from 1 to 10 carbon atoms; x is a number such that there is present from about 0.1 to about 50 mole percent acrylate-containing siloxy units; y is a number such that there is present from about 0 to 50 mole percent hydrogen-containing siloxy units with the proviso that if y is 0 there is present an organohydrogenpolysiloxane; and x+y+z is a number such that the viscosity of said polysiloxane is from about 25 centipoise to about 2,500,000 centipoise at 25° C.;

(B) at least one part by weight per 100 parts by weight of polysiloxane of a free radical photoinitiator; and (C) a precious metal-containing hydrosilation catalyst;

II. applying a coating of said curable composition to a substrate; and

III. curing said coating to said substrate by exposing the coated substrate to a source of ultraviolet radication and thereafter thermally curing said coating.

43. The article of claim 42 wherein the substrate is paper.

44. The article of claim 42 wherein the substrate is a circuit board.

45. A method for making an article of manufacture, comprising:
I. mixing, so as to form a curable composition comprising:
(A) a polysiloxane having the general formula:

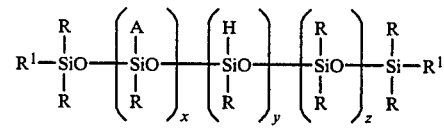

wherein each R is an independently selected substituted or unsubstituted monovalent hydrocarbon radical having from 1 to 20 carbon atoms; R¹ is hydrogen, a hydroxyl radical or a substituted or unsubstituted hydrocarbon or hydrocarbonoxy radical having from 1 to 20 carbon atoms; A is an acrylate radical having the general formula:

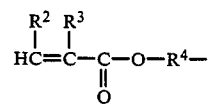

where R² and R³ are, independently, hydrogen or a substituted or unsubstituted monovalent hydrocarbon radical; R⁴ is a divalent hydrocarbon radical having from 1 to 10 carbon atoms; x is a number such that there is present from about 0.1 to about 50 mole percent acrylate-containing siloxy units; y is a number such that there is present from about 0 to 50 mole percent hydrogen-containing siloxy units with the proviso that if y is 0 there is present an organohydrogenpolysiloxane; and x+y+z is a number such that the viscosity of said polysiloxane is from about 25 centipoise to about 2,500,000 centipoise at 25° C.;

(B) at least one part by weight per 100 parts by weight of polysiloxane of a free radical photoinitiator; and (C) a precious metal-containing hydrosilation catalyst; and II. applying a coating of said curable composition to a substrate; and III. curing said coating to said substrate by exposing the coated substrate to a source of ultraviolet radiation and thereafter thermally curing said coating.

46. The method of claim 45 wherein the substrate is paper.

47. The method of claim 45 wherein the substrate is a circuit board.

48. The method of claim 45 wherein thermal curing is effected at room temperature.

49. The method of claim 45 wherein thermal curing is effected at an elevated temperature.

* * * * *